(12) United States Patent
Cruzado Parla et al.

(10) Patent No.: US 10,549,492 B2
(45) Date of Patent: Feb. 4, 2020

(54) METHOD FOR MANUFACTURING CARBON FIBER PANELS STIFFENED WITH OMEGA STRINGERS

(71) Applicant: Airbus Operations, S.L., Madrid (ES)

(72) Inventors: Gabriel Cruzado Parla, Illescas (ES); Fernando Munoz Ajenjo, Illescas (ES); Jose Cuenca Rincon, Getafe (ES); Maria Mora Medias, Getafe (ES)

(73) Assignee: Airbus Operations, S.L. (ES)

( * ) Notice: Subject to any disclaimer, the term of this patent is extended or adjusted under 35 U.S.C. 154(b) by 490 days.

(21) Appl. No.: 14/725,626

(22) Filed: May 29, 2015

(65) Prior Publication Data

US 2015/0343715 A1    Dec. 3, 2015

(30) Foreign Application Priority Data

May 30, 2014   (EP) ..................................... 14382204

(51) Int. Cl.
*B29C 33/68* (2006.01)
*B29C 70/44* (2006.01)
(Continued)

(52) U.S. Cl.
CPC .............. *B29C 70/44* (2013.01); *B29C 33/68* (2013.01); *B29K 2105/08* (2013.01);
(Continued)

(58) Field of Classification Search
CPC ................................ B29C 33/68; B29C 70/44
See application file for complete search history.

(56) References Cited

U.S. PATENT DOCUMENTS 5,454,895 A * 10/1995 Imparato ............... B29C 70/342
156/156
6,458,309 B1 * 10/2002 Allen .................... B29C 70/446
264/319
(Continued)

FOREIGN PATENT DOCUMENTS

EP        1 563 977         8/2005
WO   WO 2010/143212    * 12/2010

OTHER PUBLICATIONS

Extended European Search Report for Application No. 1438220.7 dated Nov. 11, 2014.

*Primary Examiner* — Tabassom Tadayyon Eslami
(74) *Attorney, Agent, or Firm* — Jenkins, Wilson, Taylor & Hunt, P.A.

(57) ABSTRACT

The present disclosure refers to a method for manufacturing carbon fiber panels stiffened with omega stringers for the construction of aircraft structures, such as fuselage sections, wing panels, etc. One tubular pressure member is provided for each omega stringer of the structure to be manufactured, wherein the tubular pressure member is configured with the shape of the omega stringer. Each tubular pressure member is enclosed between the omega stringer and part of the laminate, and autoclave pressure is applied to the interior of the tubular pressure member, so that the tubular pressure member is used to consolidate the omega stringers and/or part of the laminate from the interior of these two elements, while these two elements are being co-cured or co-bonded in an autoclave. Imperfections on those internal surfaces such as resin wrinkles of the structure are reduced.

9 Claims, 3 Drawing Sheets

(51) Int. Cl.
*B29K 105/08* (2006.01)
*B29K 307/04* (2006.01)
*B29L 31/30* (2006.01)

(52) U.S. Cl.
CPC ...... *B29K 2307/04* (2013.01); *B29K 2821/00* (2013.01); *B29K 2827/18* (2013.01); *B29K 2903/04* (2013.01); *B29L 2031/3076* (2013.01)

(56) References Cited

U.S. PATENT DOCUMENTS

| | | | |
|---|---|---|---|
| 2010/0186899 A1 | 7/2010 | Jackson et al. | |
| 2011/0045232 A1* | 2/2011 | Kismarton | B29C 65/562 |
| | | | 428/113 |
| 2012/0097323 A1* | 4/2012 | Nitsch | B29C 33/76 |
| | | | 156/212 |

* cited by examiner

METHOD FOR MANUFACTURING CARBON FIBER PANELS STIFFENED WITH OMEGA STRINGERS

CROSS-REFERENCE TO RELATED APPLICATION

This application claims the benefit of and priority to European patent application No. 14 382204.7 filed on May 30, 2014, the entire disclosure of which is incorporated by reference herein.

TECHNICAL FIELD

The present disclosure relates generally to the manufacture of composite structures formed by panels reinforced with omega stringers, for the construction of aircraft structures, such as fuselage sections, wing panels, rudder and elevator panels, etc.

More specifically, the disclosure herein relates to a method for manufacturing carbon fiber panels stiffened with omega stringers, which significantly reduces superficial imperfections, mainly resin wrinkles, at the internal surfaces of the structure being manufactured, such as the structure after the curing process is formed with improved quality, and manual operations for correcting defects are reduced.

BACKGROUND

It is generally known to reinforce carbon fiber skin panels with carbon fiber stringers in order to withstand the high loads that an aircraft has to withstand during flight, take offs and landings. Skin panels of an aircraft such as fuselage skin panels, are usually reinforced with several types of stringers: T, U, J and omega-shaped stringers.

Omega stringers have generally a trapezoidal configuration in a cross-sectional view, with two lateral extensions called stringer foot through which the stringer is joined to the skin panel. The omega stringers can be pre-cured and adhesively bonded with the panel (co-bonded), or alternatively the stringers and the skin panel are co-cured together.

In one alternative for manufacturing these stiffened skin panels, cured stringers or un-cured pre-formed stringers are first placed in respective grooves formed on a male tool or a mandrel, as for example a barrel type mandrel for the manufacture of a fuselage section of an aircraft, and the a skin panel is formed on the mandrel by laying up a plurality of composite plies to form a laminate, by known automated process. Alternatively, a female tool can be used instead of the male tool, and in this case the skin is first laminated on the female tool, and then cured or un-cured stringers are conveniently placed on the laminate.

Finally, the skin panel and the stringers are co-bonded together if cured stringers have been used, or alternatively the skin and the stringers are co-cured together in the case that un-curd stinger have been used.

Due to the shape of the omega stringers, closed channels are formed between the omega stringers and the skin panel to which the stringers are joined, thereby internal surfaces are formed alone those channels which also need to be consolidate gad from the inside of the stringer. Usually for consolidating these internals parts of the structure during curing, tubular vacuum bags are paced inside the closed channels extending lengthwise. These tubular vacuum bags are typically made of a flexible thin film, and are placed inside the stringers in a contracted or deformed state, that is the outer surface of these bags is completely wrinkled.

Autoclave pressure is then applied inside these tubular bags, which causes the bag to inflate to exert pressure on those internal surfaces of the stringer. The process of using these tubular vacuum bags is affected by the following drawbacks:

- bad superficial quality of the inner surface of omega stringer. Even if the tubular vacuum bag expands due to the autoclave pressure being applied to its interior, the outer surface of the tubular vacuum bag cannot adapt completely to the internal surface of the stringer, especially at its corners. This means that some wrinkles remain on the surface of the vacuum bag during the curing process, which causes the formation of resin wrinkles on those internal surfaces.
- manual operations are needed to correct superficial defects due to resin wrinkles. To correct those defects, sections of the omega stringers where a resin wrinkle is detected, need to be cut out and replaced by a new stringer section.
- high probability of breaking the tubular bags while they are being inflated and subsequent extraction of the bags.

SUMMARY

It is an object of the disclosure herein to provide a method for manufacturing carbon fiber panels stiffened with omega stringers, which significantly reduces superficial imperfections, mainly resin wrinkles, at the internal surfaces of the structure being manufactured, such as the structure after the curing process is formed with improved quality, and manual operations for correcting defects are reduced.

The present disclosure overcomes the above-mentioned drawbacks of the prior art, such as by providing a more reliable manufacturing technique for the production of composite structures formed by panels stiffened with omega stringers with improved quality with regard to the smoothness of internal surfaces, so that manual operations to eliminate imperfections are significantly reduced.

Although the disclosure herein is described with reference to omega stringers, it should be understood that the same principles of the disclosure herein also apply to the manufacture of skin panels reinforced with any type of stringers with semi-tubular form. Therefore, in the present description and claims the term omega stringer should be understood to encompass variations of an omega shape, as for example U-shaped stringers.

In the method according to the disclosure herein, at least one a tubular pressure member is provided for each omega stringer of the structure to be manufactured, and that tubular pressure member is manufactured with the cross-sectional shape of the channel defined by an omega stringer, that is, the tubular pressure member is manufactured with a similar cross-sectional shape than the omega stringer internal channel and the same or larger length than the stringer.

The material for manufacturing the tubular pressure member is selected such as, the tubular pressure member can be manufactured as a self-supporting body, that is, with a certain degree of rigidity which allows the body to maintain its shape by itself, and to have outer surfaces generally flat, that is, free of wrinkles. At the same time, the material to manufacture the tubular pressure member has certain degree of elasticity, which allows this member to expand outwardly when pressure is applied to its interior.

Each tubular pressure member is coupled with an omega stringer, such the tubular pressure member is received or buried within the channel defined by the omega stringer, or in other words the channel is substantially filled by the tubular pressure member. The omega stringers can be cured or alternatively they can be un-cured and pre-formed.

The skin of the structure is formed by a laminate of un-cured carbon fiber plies, and the set of omega stringers and the laminate a brought in contact to form the structure, which can be carried out in a male or a female tool as explained before with respect to known techniques.

The tubular pressure member is used to consolidate part of the omega stringer and part of the laminate from the interior of these two elements, while these two elements are being co-cured or co-bonded in an autoclave. For that, a tubular vacuum bag (made of an air-tight material) is inserted inside the tubular pressure member extending lengthwise therein, and autoclave pressure is applied to the interior of the tubular vacuum bag such as the tubular vacuum bag forces the tubular pressure member to expand due to its elasticity, and exert pressure against part of the omega stringer and part of the laminate, while the omega stringer and the laminate are co-cured or co-bonded in the autoclave.

A technical effect derived from the process of internally pressing the omega stringer and the overlapping part of the laminate with tubular pressure member according to the disclosure herein, is that, during the curing process the outer surface of the tubular pressure member gets entirely in contact with the internal surfaces of those parts, which are thereby obtained with a smooth finish free of imperfections such as resin wrinkles. Additionally, good transition at the corners between stringer and skin panel is obtained, and the probability of damaging the tubular vacuum bags is significantly reduced.

On the other hand, as the carbon fiber is being cured and consolidated, the carbon fiber is compacted and the thickness of the stringer and the laminate are reduced, hence the volume of the chamber between the omega stringer and the laminate is enlarged during the curing process. Another technical effect derived from the application of pressure to the interior of the tubular pressure member, is that, this member expands due to its elasticity as the carbon fiber is being compacted applying pressure to the same during the entire curing process.

BRIEF DESCRIPTION OF THE DRAWINGS

Preferred embodiments of the disclosure herein are henceforth described with reference to the accompanying drawings, wherein.

DETAILED DESCRIPTION

Figure 1:
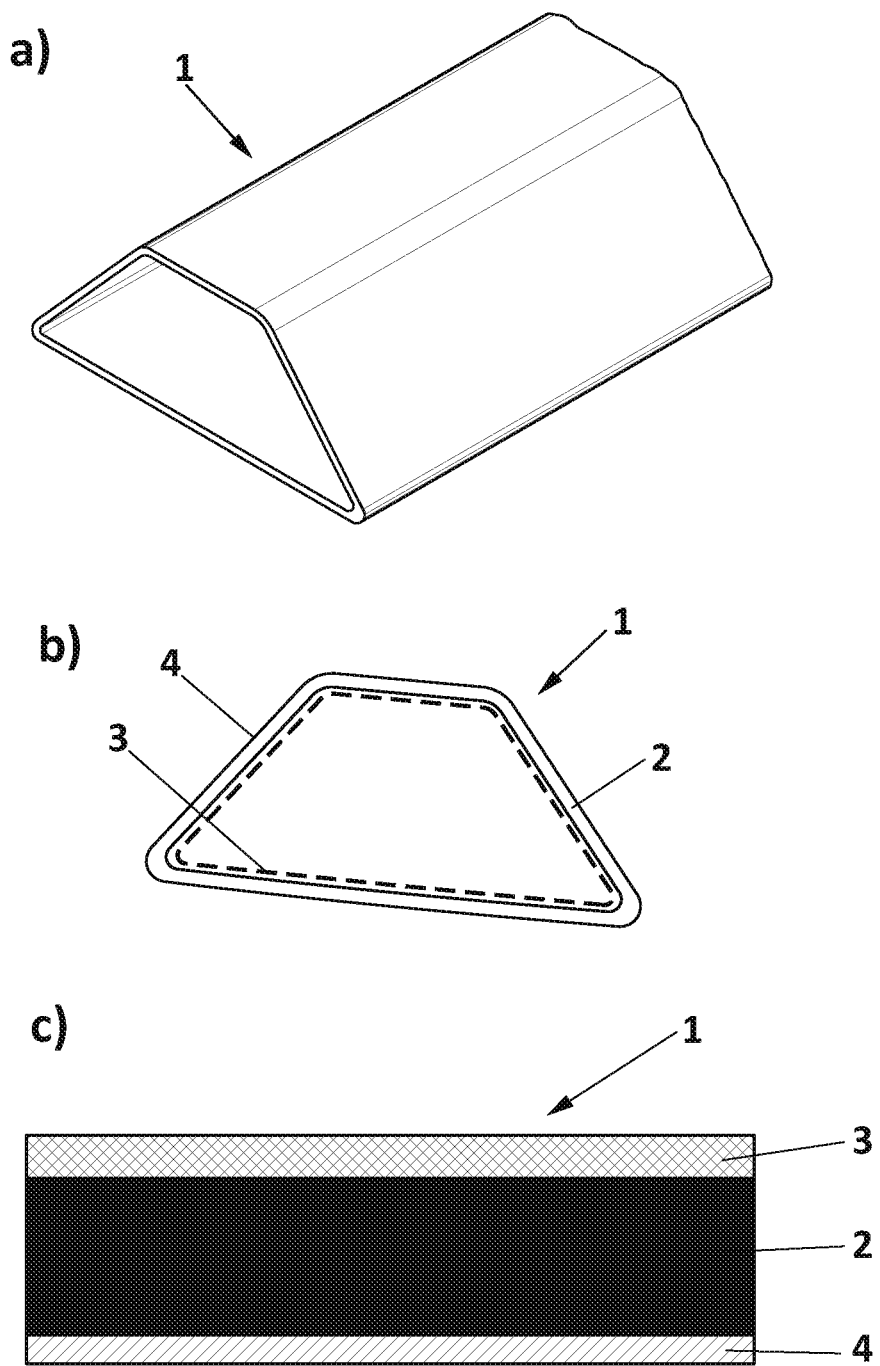
FIG. 1 shows an schematic representation of a tubular pressure member according to an exemplary embodiment of the disclosure herein when it is made of an elastomeric material, wherein drawing (a) is a perspective view, drawing (b) is a cross-sectional view, and drawing (c) is a longitudinal section of one of the faces of the tubular caul plate.

FIG. 1 represents a preferred embodiment of a tubular pressure member (1) according to the disclosure herein, which in this case is formed by the superposition of three different elements, all of them with the same trapezoidal configuration corresponding to a specific shape of an omega stringer, therefore the tubular pressure member (1) is formed by four sides and four corners between consecutive sides. The length of the tubular pressure member is at least the same that the length of the omega stringer to which it will be coupled.

More specifically, the tubular pressure member (1) comprises a tubular core (2) made of an elastomeric material such as rubber, which is entirely covered on its outer surface by a layer of release film (3) made of a known material suitable to facilitate removing the tubular pressure member (1) from the composite structure (5) being manufactured, once the curing process has been completed.

The tubular pressure member (1) is internally reinforced with a layer of a composite material (4) such as a fiber glass, which provides structural stability to the tubular core (2) but still allowing the elastomeric core to expand. Both the layer of release film (3) and the layer of composite material (1) are integrally joined to the tubular elastomeric core during its vulcanization.

Figure 2:
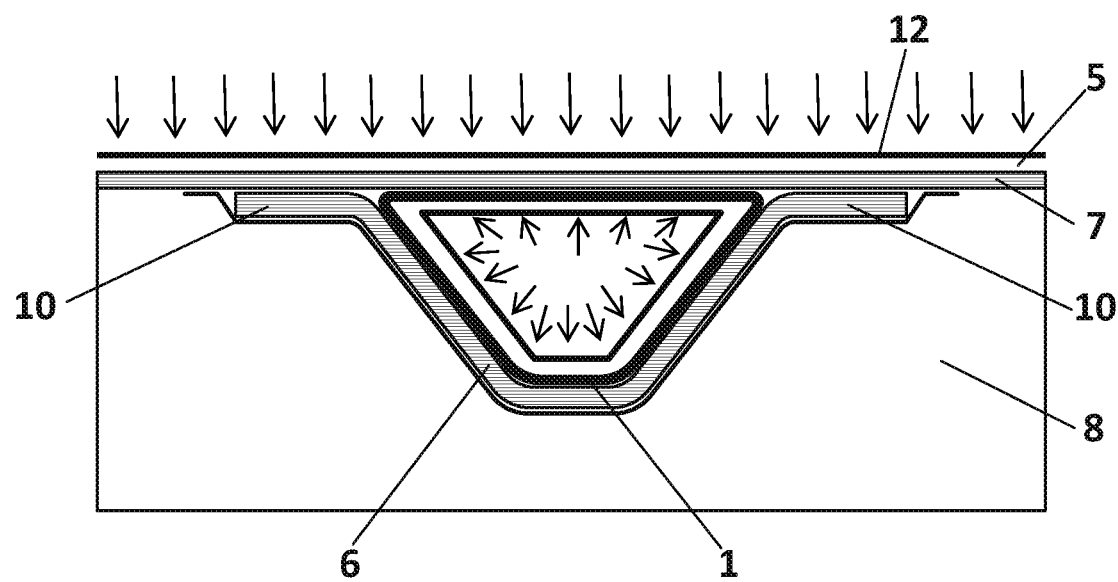
FIG. 2 shows an schematic representation of a cross-sectional view of the assembly formed by the omega stringer joined with a skin plate, the elastomeric tubular pressure member and the, tubular vacuum bag, while autoclave pressure, represented by arrows, is being applied to the assembly.

FIG. 2 shows the tubular pressure member (1) of FIG. 1 fitted or coupled inside the channel defined by an omega stringer (6), and since the trapezoidal shape of the pressure member is substantially the same as the trapezoidal shape of that channel, the tubular pressure member fits to the shape of the stringer channel such as that channel is filled by the tubular pressure member (1).

At this stage, the omega stringer (6) is a pre-form of uncured plies, and it is received within a groove of a metallic male tool or mandrel (8). A laminate (7) of uncured carbon fiber plies which will form the skin panel of the structure is then layered up on the outer surface of the male tool (8) and on the omega stringer foot (10).

It can be observed in this figure, how the part of the laminate (7) which overlaps the channel of the omega stringer (6), is also in contact with one of the sides of the tubular pressure member (1), and how the tubular pressure member (1) is enclosed or surrounded by part of the omega stringer (1) and also part of the laminate (7), so that the tubular pressure member (1) is in direct contact with these parts through the layer of release film (4). A tubular vacuum bag (11) is placed inside the tubular pressure member (1).

A main reason for damaging this type of tubular vacuum bags, is that they are forced to inflate when pressure is applied to their interior, but occasionally these bags cannot inflate properly in all its areas and reach all the internal surface properly, and then excessive pressure is applied to some local areas of the vacuum bag.

FIG. 2 shows only one omega stringer (6) and part of a laminate (7), however it would be clear for a skilled person, that a complete structure (5) is formed by a large laminate (7) to form for example the tubular skin of a fuselage section, and a plurality of omega stringers (6) as the one shown in FIG. 2.

In the method of the disclosure herein, the assembly shown in FIG. 2 is covered completely with an external vacuum bag (12), and then the entire assembly is placed inside an autoclave (not shown) for curing the structure (5) in a known manner, by the simultaneous application of heat and pressure. Vacuum is also applied between vacuum bag (11) and the structure (5).

As shown in FIG. 2, the autoclave pressure (represented by arrows) is applied to the interior of the tubular pressure member (1) through the tubular vacuum bag (11) which inflates and forces the tubular pressure member (1) to expand outwardly due to its elasticity, which in turn exerts pressure on the internal surfaces of the omega stringer (6) and the overlapping part of the laminate (7) to consolidate these parts of the structure.

Due to the pressure exerted by the tubular pressure member (1), it is assured that after curing, the internal surfaces of the omega stringer (6) and the laminate (7) in direct contact with it are obtained as smooth surfaces free of wrinkles, and that the piece is accurately obtained with the desired geometry.

The tubular pressure member (6) and tubular vacuum bags (11) are removed from the completed structure (5), and they are prepared to be used in subsequent manufacturing cycles. This tubular pressure member (6) made of an elastomeric material can be used repeatedly is several manufacturing cycles, at least 25 cycles.

Figure 3:
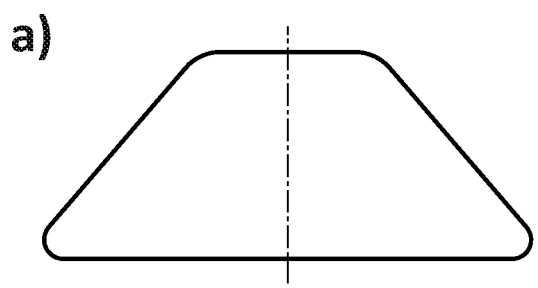
FIG. 3 is a representation a tubular pressure member according to another exemplary embodiment of the disclosure herein when it consist of a release film perform, wherein drawing (a) is a cross-sectional view of the same, and drawing (b) is a perspective view.
Figure 3:
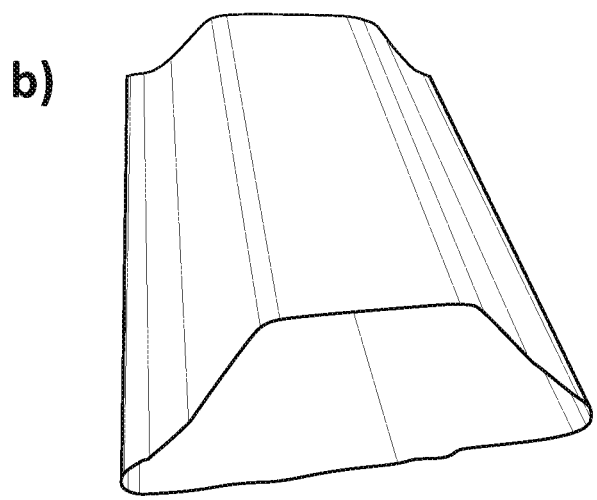

Alternatively, in another preferred embodiment of the disclosure herein, the tubular pressure member (1) is a release film preform as shown in FIG. 3. A release film is a well known material widely used in this industry for manufacturing high-quality composite parts. A known release film typically comprises a fluorinated ethylene propylene composition (FEP) or a polytetrafluoroethylene (PTFE) composition.

In this preferred embodiment of the disclosure herein, the tubular pressure member (1) is manufactured with release film for example by a molding process, and it has been found that a suitable thickness of the this release film for this use is within the range 0.1 to 0.7 mm, and preferably 0.25 mm, so that this tubular pressure member (1) can be handled without being deformed and at the same time is has the required degree of elasticity.

Figure 4:
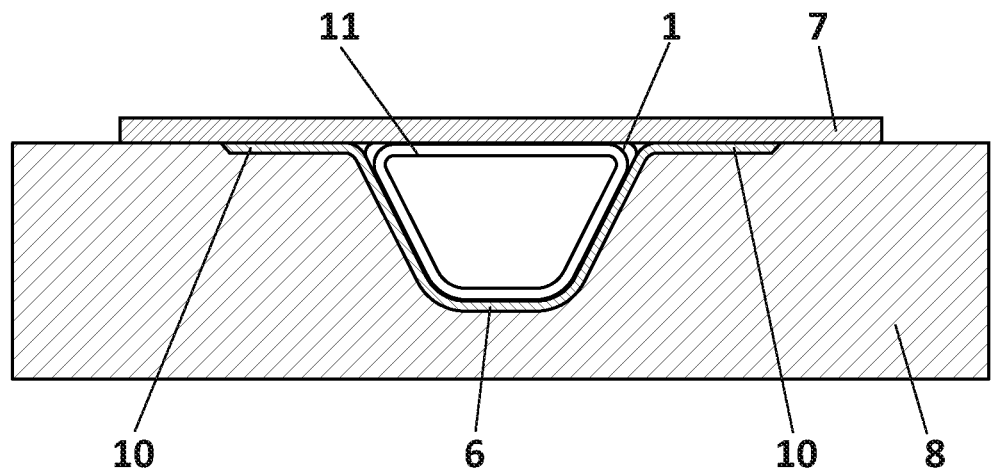
FIG. 4 is a similar representation than FIG. 2 but using a release film perform as a tubular pressure member.
Figure 5:
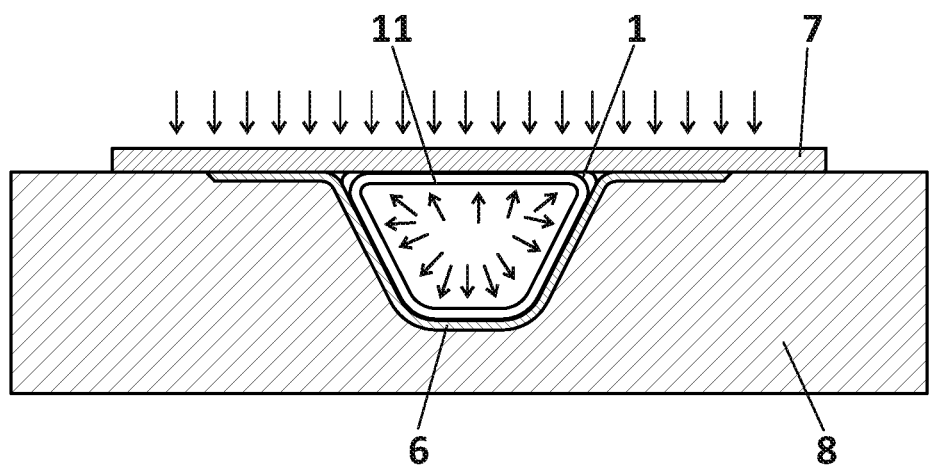
FIG. 5 is a similar representation than FIG. 4 while autoclave pressure, represented by arrows, is being applied to the assembly.

FIGS. 4 and 5 shows the tubular pressure member (1) made of a release film buried inside an omega stringer (6) and a laminate (7). The tubular pressure member (1) is forced to expand by increasing the pressure inside a tubular vacuum bag (11) placed in the interior of the tubular pressure member (1), as described previously with respect to FIG. 2.

A tubular pressure member (1) made of a release film perform cannot be reused, but it is much cheaper than a tubular pressure member made of elastomeric material.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority. Other preferred embodiments of the present disclosure are described in the appended dependent claims and the multiple combinations thereof.

The invention claimed is:

1. A method for manufacturing carbon fiber panels stiffened with omega stringers comprising:
    providing at least one omega stringer in a cured or un-cured state;
    providing at least one tubular pressure member manufactured with a cross-sectional shape of a channel defined by an omega stringer, and having at least the same length as the omega stringer;
    placing the tubular pressure member inside the channel of the omega stringer without use of a rigid support core;
    inserting a tubular vacuum bag inside the tubular pressure member;
    bringing in contact a laminate of uncured carbon fiber plies with the omega stringer, such that the tubular pressure element is enclosed by the laminate and the omega stringer; and
    applying autoclave pressure to an interior of the tubular vacuum bag such that the tubular vacuum bag forces the tubular pressure member to expand and exert pressure against part of the omega stringer and part of the laminate,
    wherein the tubular pressure member is a self-supporting body,
    wherein the tubular pressure member is made of an elastomeric material having an outer surface covered by a layer of release film material adhered to the outer surface, and
    wherein the layer of release film and a layer of composite material are joined to the elastomeric material during vulcanization of the elastomeric material.

2. The method according to claim 1, wherein the internal surface of the elastomeric material is covered with the layer of composite material adhered to that internal surface.

3. The method according to claim 1, wherein the tubular pressure member is a release film pre-form.

4. The method according to claim 3, wherein the thickness of the release film pre-form is within a range 0.1 to 0.7 mm.

5. The method according to claim 3, wherein the release film pre-form comprises a polytetrafluoroethylene (PFTE) or a fluorinated ethylene propylene (FEP) composition.

6. The method according to claim 1, wherein the tubular pressure member has a trapezoidal cross-sectional configuration.

7. The method according to claim 1, wherein an external vacuum bag is arranged enclosing the omega stringer and the laminate, and wherein the method further comprises joining edges of free ends of individual tubular vacuum bags with the external vacuum bag, such as during a curing process the autoclave pressure is applied to the interior of the tubular vacuum bags, and vacuum is applied to a space between the external vacuum bag and the individual vacuum bags and the omega stringer and laminate being cured.

8. The method according to claim 1, wherein the elastomeric material of the pressure member is made of rubber.

9. The method according to claim 1, wherein the layer of composite material is fiber glass.

* * * * *